United States Patent
Skoll (12)

(10) Patent No.: US 6,763,140 B1
(45) Date of Patent: Jul. 13, 2004

(54) METHOD AND APPARATUS FOR FOCUSING A MICRO-IMAGING SYSTEM ONTO A TILTED OR UNEVEN SAMPLE TO ACQUIRE IMAGES OF THE SAMPLE

(75) Inventor: David F. Skoll, Ottawa (CA)

(73) Assignee: Chipworks, Ottawa (CA)

( * ) Notice: Subject to any disclaimer, the term of this patent is extended or adjusted under 35 U.S.C. 154(b) by 655 days.

(21) Appl. No.: 09/657,164

(22) Filed: Sep. 7, 2000

(51) Int. Cl.$^7$ .......................... G06K 9/40; G02B 27/40; G01B 11/14
(52) U.S. Cl. ................... 382/255; 382/141; 250/201.6; 356/624
(58) Field of Search ............................... 382/141, 148, 382/173, 190, 255, 151; 250/201.3, 201.6, 201.8, 200; 355/55; 359/656; 356/601, 609, 624

(56) References Cited

U.S. PATENT DOCUMENTS

| | | | | |
|---|---|---|---|---|
| 4,951,151 A | * | 8/1990 | Sorenson et al. | 348/744 |
| 5,086,015 A | * | 2/1992 | Itoh et al. | 204/192.34 |
| 5,239,170 A | * | 8/1993 | Hughlett | 250/201.3 |
| 5,365,302 A | * | 11/1994 | Kodama | 396/51 |
| 5,424,528 A | * | 6/1995 | Goto | 250/201.8 |
| 5,647,025 A | | 7/1997 | Frost et al. | 382/255 |
| 5,825,043 A | * | 10/1998 | Suwa | 250/548 |
| 6,356,263 B2 | * | 3/2002 | Migdal et al. | 345/423 |
| 6,509,952 B1 | * | 1/2003 | Govil et al. | 355/52 |

FOREIGN PATENT DOCUMENTS

| CA | 2200463 | 8/1995 |
|---|---|---|

* cited by examiner

Primary Examiner—Kanji Patel
(74) Attorney, Agent, or Firm—Max R. Wood; Ogilvy Renault

(57) ABSTRACT

A mesh is created from selected focus points having locations on a surface of interest of a sample being micro-imaged. The mesh and associated focus settings of the focus points are used to define adjacent focus facets forming a focus surface substantially coincident with the surface of interest of the sample. In micro-imaging the sample, a micro-imaged portion of the surface of interest is segmented for the purpose of acquiring tile images. A tile image focus location is used to extract a tile image focus setting from the focus surface. A tile image focus determination process selects a focus facet coincident with the tile image focus location and interpolates a tile image focus setting from focus settings associated with the focus points defining the focus facet. If a coincident focus facet is not found, the tile image focus setting is set to the focus setting of a nearest focus point. Dependence on autofocus is thus eliminated, providing faster imaging and better focused images.

28 Claims, 10 Drawing Sheets

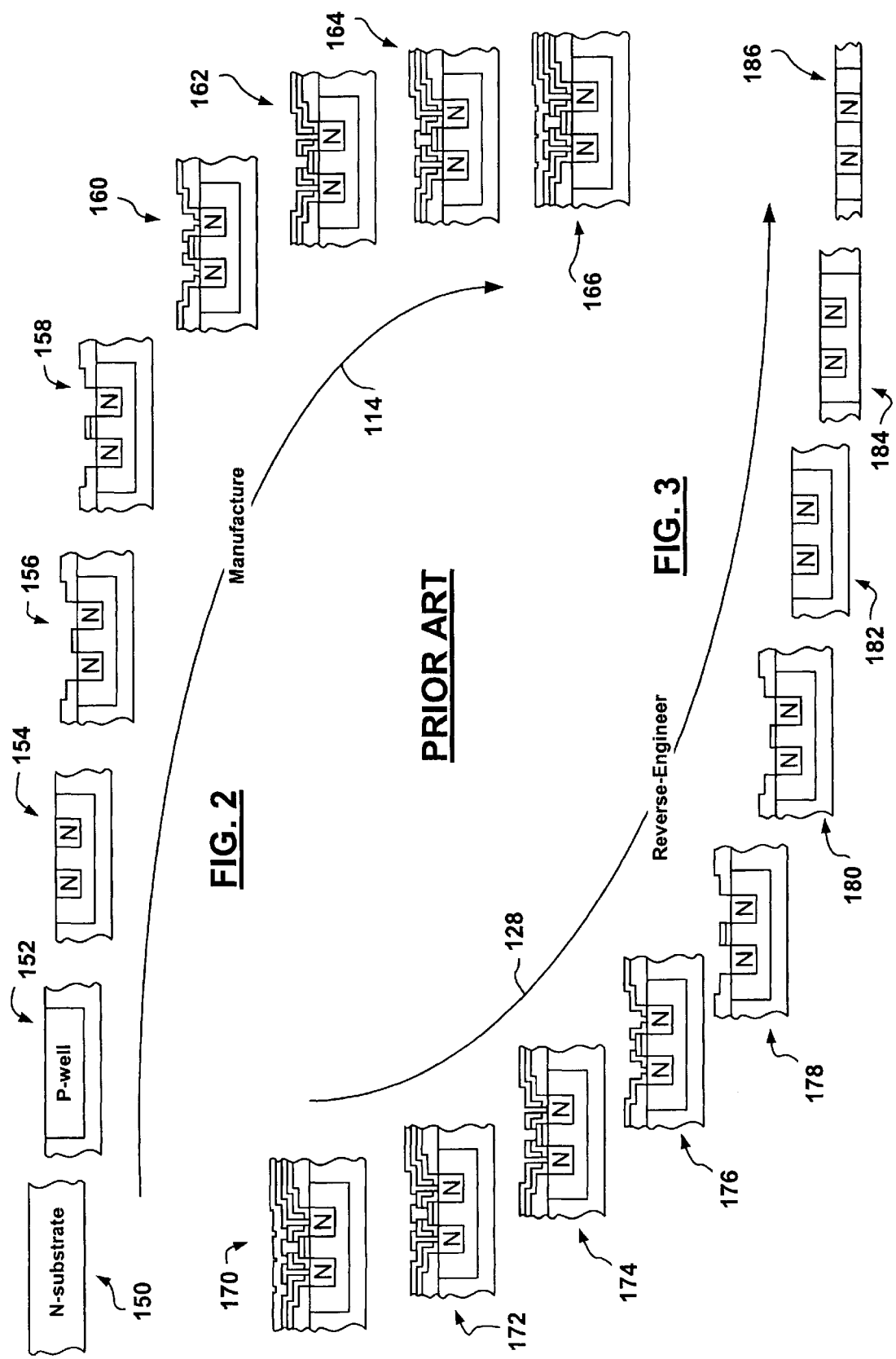

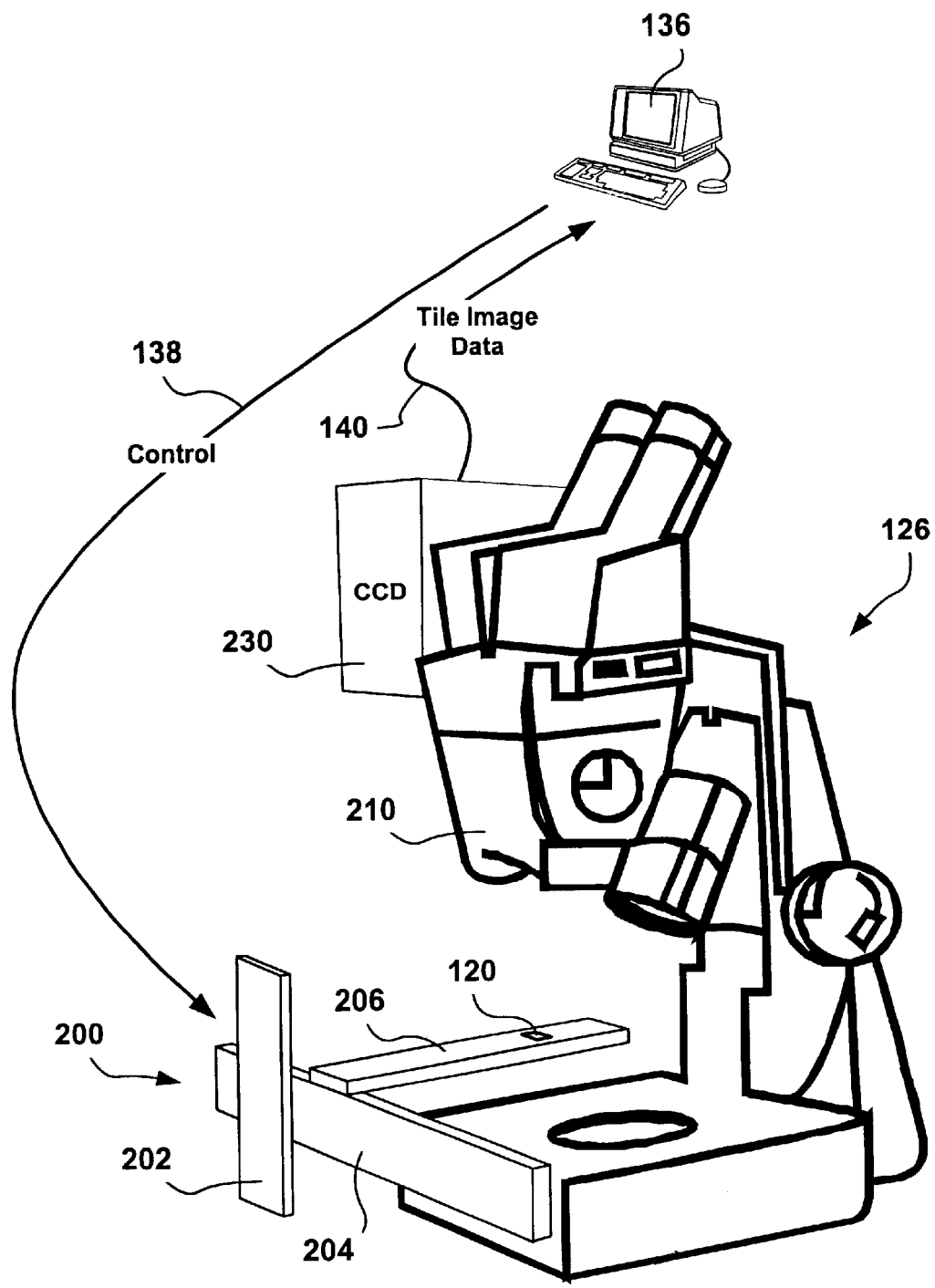
FIG. 4          PRIOR ART

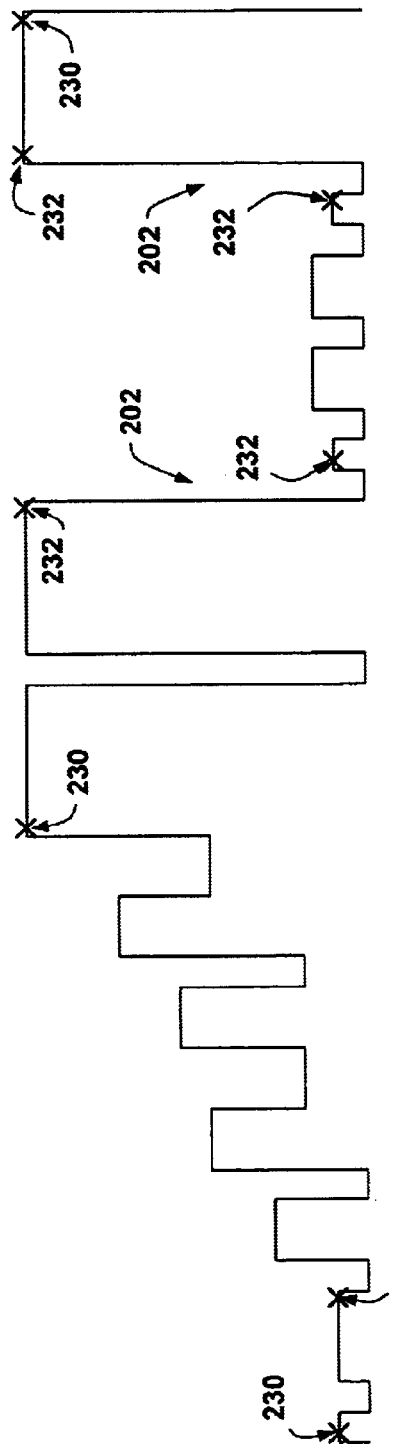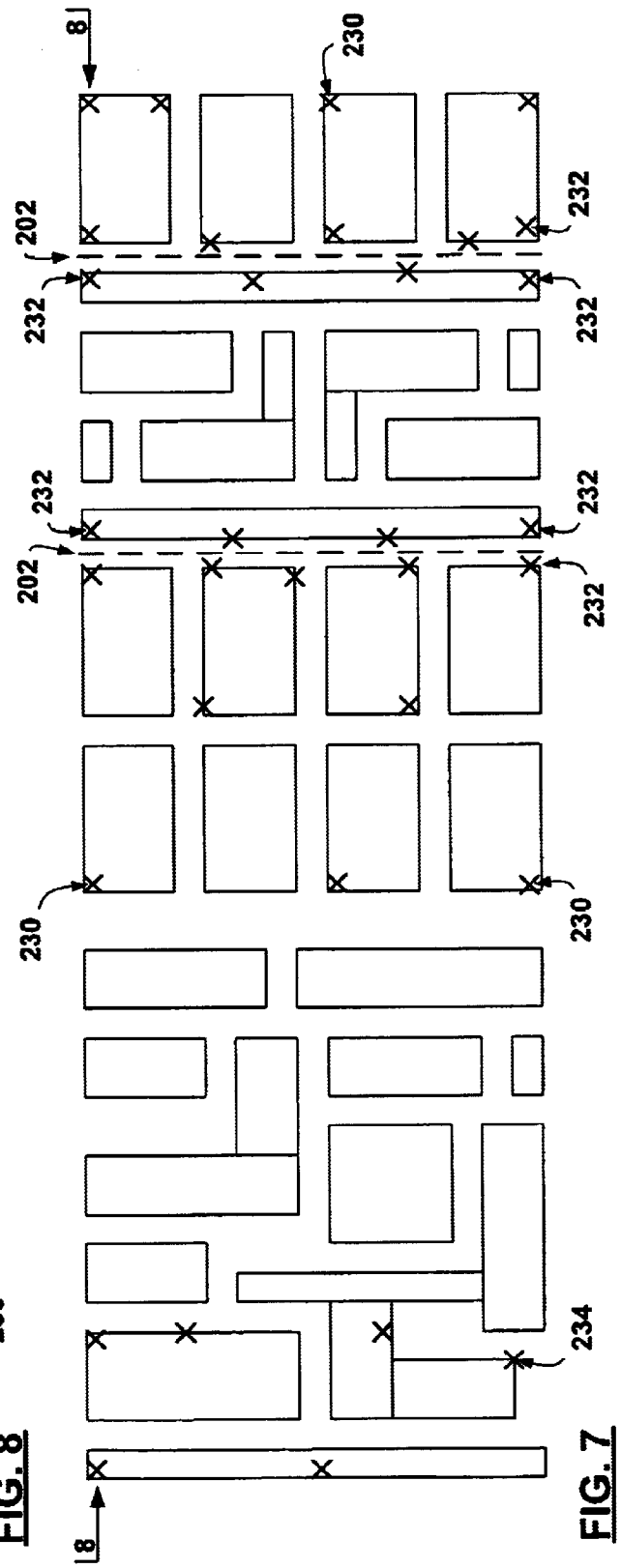
FIG. 8
FIG. 7

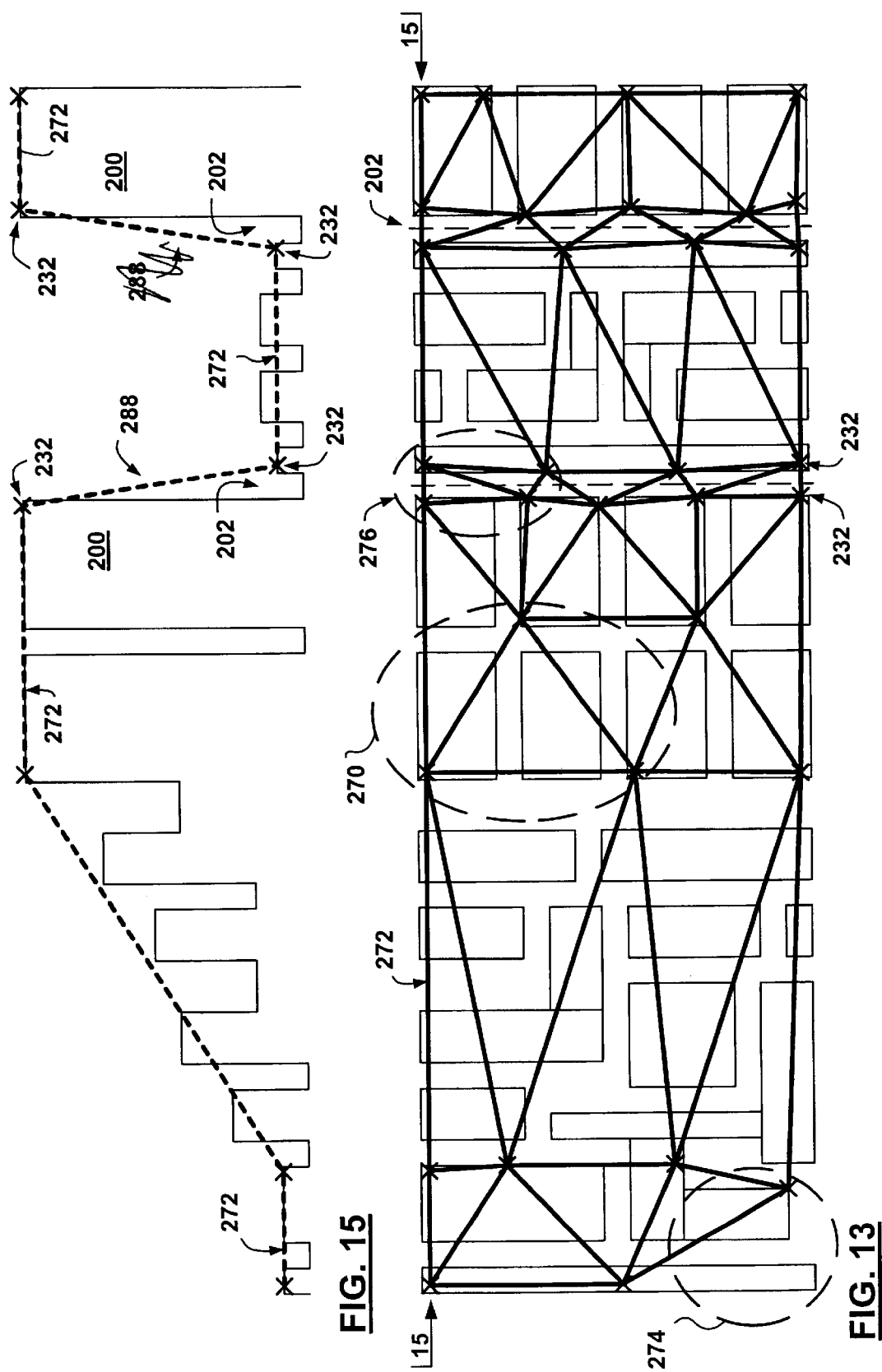

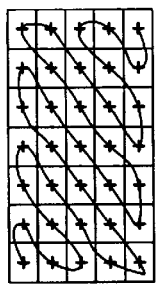
FIG. 17
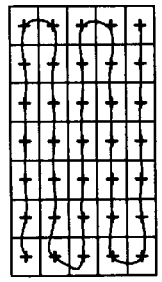
FIG. 19
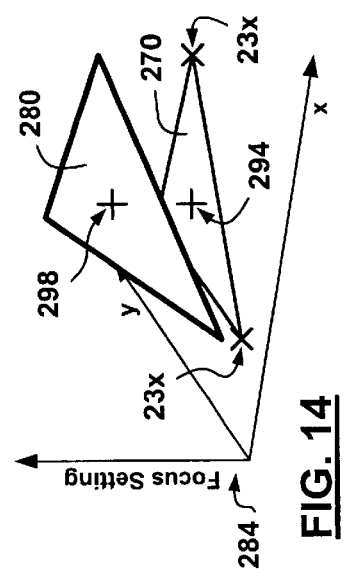
FIG. 14
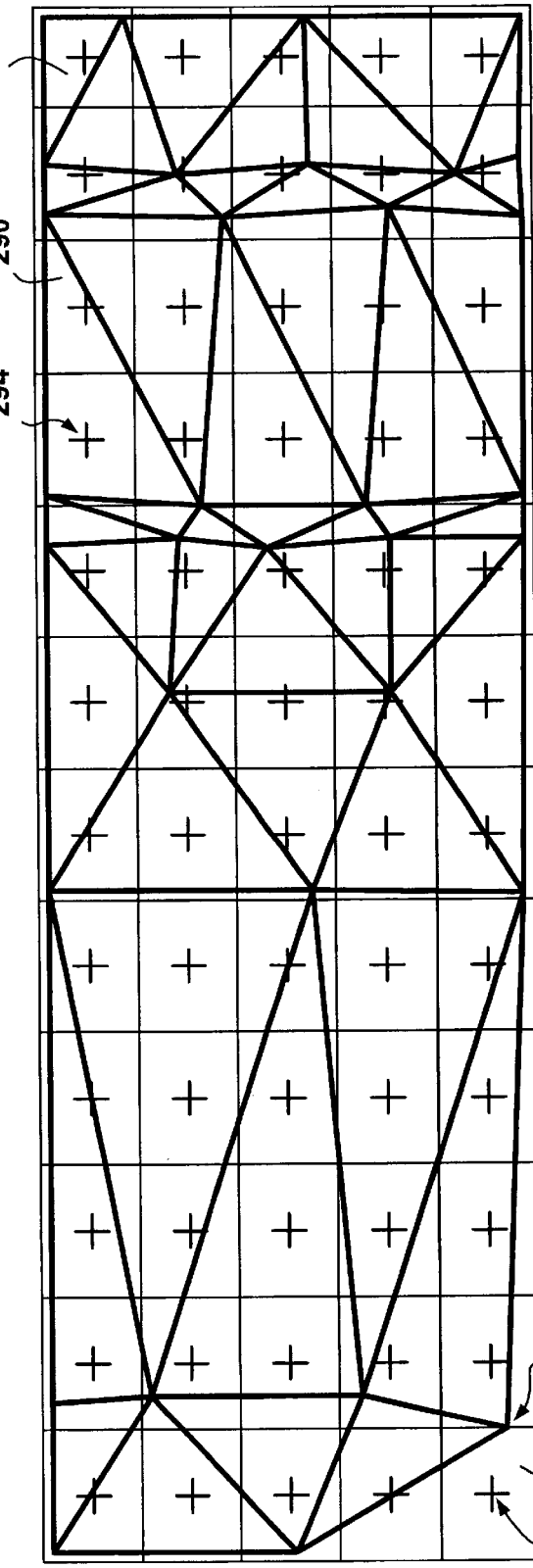
FIG. 16
FIG. 18

METHOD AND APPARATUS FOR FOCUSING A MICRO-IMAGING SYSTEM ONTO A TILTED OR UNEVEN SAMPLE TO ACQUIRE IMAGES OF THE SAMPLE

CROSS-REFERENCE TO RELATED APPLICATIONS

This is the first application filed for the present invention.

TECHNICAL FIELD

The invention relates to the field of micro-imaging and, in particular, to methods and apparatus for acquiring high magnification images of a tilted and/or uneven sample using a micro-imaging system having a shallow depth-of-field.

BACKGROUND OF THE INVENTION

In the field of micro-imaging a high magnification imaging instrument is used to acquire images of a sample. Magnification powers of 100× or more are used for micro-imaging semiconductor integrated circuits (IC) to extract design and layout information for the purposes of design verification, product quality assurance and reverse engineering. At such high magnifications, a parameter of the high magnification microscope known in the art as the depth-of-field becomes very important.

According to what is know in the art as the "Thin Lens Approximation", while imaging an object using a theoretical optical system only an infinitesimally thin object plane in front of the optical system is in focus on an infinitesimally thin image plane, behind the optical system. The depth-of-field corresponds to the thickness of the image plane and therefore, in theory, the depth-of-field approximates zero. In practice, while imaging an object, features behind and in front of the theoretical object plane are also focused on the image plane. The depth-of-field is the thickness of the slice around the object plane that can be imaged in-focus.

Imaging objects at most one to two orders of magnitude smaller than constituent optical elements of an optical imaging system operating at small powers of magnification, the depth-of-field is large enough to capture an entirety of such objects in focus. However in micro-imaging sample IC's using a 100× power magnification: the optical elements are at most a few orders of magnitude larger than traces on a sample IC (~1 mm:~1 μm). The width of traces on the sample IC is just wide enough that interference/diffraction effects are minimal when using ultraviolet light, and the pixel size of the CCD is comparable to the trace width. This results in a dept-of-field that is about the size of the width of a trace or about the thickness of a deposition layer on an IC.

Semiconductor components manufactured on a silicon substrate of an IC are several deposition layers in height. Traces interconnecting components on the silicon substrate transcend deposition layers. The components and interconnecting traces form a relief on the silicon substrate. Focusing not only becomes very important, autofocusing techniques are unsuitable because a range of focus settings of the micro-imaging system will appear to provide in-focus images, each image correctly focusing on different features distributed over a range of deposition layers.

U.S. Pat. No. 5,647,025 entitled "AUTOMATIC FOCUSING OF BIOMEDICAL SPECIMENS APPARATUS" which issued on Jul. 8, 1997 to Frost, et al. describes an apparatus for inspecting biological specimens and a method for automatically focusing on features using morphological criteria such as brightness, contrast, size, shape, texture and context. The apparatus is adapted to extract a focus measure concurrent with performing pattern recognition. The pattern recognition is optimized for biological cell detection in a particular size range and having a particular geometry. Methods for detecting biological cell nuclei are also presented. While this invention has merit, it is not suited for micro-imaging sample IC's to extract design and layout information. The methods described by Frost only provide suitable autofocusing at 4× magnification with a field of view of 1.4 mm square. At this magnification the depth-of-field has a substantial thickness enabling reliable focusing on discrete biological cells having cell nuclei. A comparable depth-of-field is not available at 100× magnifications required for micro-imaging a sample IC.

Frost's methods provide a timely inspection of a slide having approximately 700 fields of view. In micro-imaging sample IC's a surface of interest is typically divided in excess of 10,000 fields of view each corresponding to a tile-image to be acquired. Autofocusing operations performed according to Frost's teachings to acquire tile images would be time consuming and therefore unsuitable. Minimizing the time taken to acquire tile images is very important as pointed out in co-pending United States patent application entitled "METHOD AND SYSTEM FOR RECALIBRATION DURING MICRO-IMAGING TO DETERMINE THERMAL DRIFT", which was filed on Jun. 15, 2000 and assigned Ser. No. 09/594,169, the specification of which is incorporated herein by reference.

Therefore in micro-imaging a surface of interest for a sample IC, there is a need for methods and apparatus for providing focus settings to enable the acquisition of a very large number of tile-images of the surface of interest.

SUMMARY OF THE INVENTION

It is therefore an object of the invention to provide an interface for selecting locations for a plurality of focus points on a surface of interest of a sample IC to be micro-imaged and to select a focus setting associated with each focus point.

It is another object of the invention to compute a virtual focus surface that substantially mimics a surface topology found by components and interconnecting traces manufactured on sample IC silicon substrate, using a plurality of focus point locations and the associated focus settings.

It is yet another object of the invention to compute a tile image focus setting at a tile image focus location based on the focus surface and the plurality of focus points.

According to one aspect of the invention, there is provided an apparatus for micro-imaging an uneven surface of interest of a sample comprising means for selecting and storing positional coordinates of focus points associated with a sample coordinate space defined by the sample, to create a focus point list, means for determining an associated focus setting for each focus point in the focus point list, and means for generating a focus surface using the focus point list, as well as means for extracting a tile image focus setting at a tile image focus location from the focus surface, and means for positioning a micro-imaging system to acquire a tile image at the tile image focus setting.

The means for selecting and storing positional coordinates of focus points associated with a sample coordinate space preferably comprises a man-machine interface for sending control messages to the micro-imaging system, and receiving image data from the micro-imaging system. The means for determining a focus setting associated with each focus point further comprises means for extracting a focus measure from image data received from the micro-imaging system. The means for extracting a focus measure is prefreably an algorithm that performs pixel operations on the image data to extract, for example, a sharpness measure. The means for generating a focus surface using the focus point list comprises means for grouping focus points from the focus point list into focus point groups, the focus point groups being stored in a focus point group list. The means for grouping focus points into focus point groups comprises a focus point grouping algorithm, the positional coordinates and the associated focus setting of each focus point in a focus point group forming a focus facet, and the focus surface comprises abutting focus facets. The focus point grouping algorithm is preferably a mesh generation algorithm, for example, a triangular mesh generation algorithm. If so, each focus point group is a focus point triad. A preferred triangular mesh generation algorithm is the Delaunay triangulation algorithm, which is well known in the art. In order to ensure accurate focusing, the means for grouping focus points into focus point groups preferably further comprises a focus point group exclusion algorithm for excluding from the focus point group list a focus point group having substantially collinear focus points.

The means for extracting a tile image focus setting at a tile image focus location from the focus surface comprises an algorithm that selects a focus facet coincident with the tile image focus location, interpolates at the tile image focus location the focus settings associated with the focus points in the focus point group associated with the selected focus facet and sets the tile image focus setting to the interpolated focus setting. If the tile image focus location is not coincident with a focus facet, the means for extracting a tile image focus setting at a tile image focus location from the focus surface comprises an algorithm for selecting a closest focus point to the tile image focus location and setting the tile image focus setting to the focus setting associated with the closest focus point.

The invention also provides a method of generating a focus surface for determining a focus setting for a micro-imaging system used to capture micro-images of a surface of interest of a sample. The method comprises steps of: selecting a plurality of focus points respectively having focus point positional coordinates with respect to a sample coordinate space, to create a focus point list, at least some of the focus points being selected in close proximity to each other in the vicinity of an abrupt change in elevation of the surface of interest; determining a focus setting for each focus point; and compiling a list of focus point groups from the focus point list. The focus point list is stored after it is created.

Each of the focus point groups comprises three focus points that form a focus point triad. Each focus point triad defines a triangular mesh cell in the sample coordinate space. The combination of the focus point positions and the focus point settings of the focus points defining a triangular focus facet and the focus surface comprises adjacent triangular focus facets. Mesh cells are generated by a mesh generation algorithm using the plurality of focus points. The mesh generation algorithm preferably comprises a triangulation algorithm, such as the Delaunay triangulation algorithm.

The invention further provides a method of determining a tile image focus setting for micro-imaging a tile image constituent of an image-mosaic representative of a surface of interest of a sample having at least a one of a tilted and an uneven surface of interest. The method comprises steps of selecting a tile image to be acquired, the tile image having an associated tile image focus location with respect to a sample coordinate space defined by the sample; determining a focus facet coincident with the tile image focus location using a focus facet list associated with a focus surface of the sample, each focus facet in the focus facet list being defined by a focus point group, and focus points in each focus point group having respective positional coordinates with respect to the sample coordinate space, and an associated focus setting; and, interpolating the focus settings of the focus points of the focus facet coincident with the tile image focus location to determine a tile image focus setting for acquiring the tile image. The tile images have a predetermined shape and the tile image focus location is typically a geometrical center of the tile image.

The focus facet list is preferably parsed to exclude focus facets from the focus facet list that have substantially collinear focus points, in order to ensure that such focus facets are not used for focus setting. The focus facets are excluded from the focus facet list by computing a collinearity measure using positional coordinates of the focus points of the focus facet. The collinearity of the focus points of a focus facet is determined by, for example, computing an area of a mesh cell associated with the focus facet. The computed area is used as the collinearity measure. When a collinearity measure of the focus points is determined to be less than a predetermined threshold, the focus facet is excluded from the focus facet list.

For tile images having tile image focus locations outside all focus facets in the focus facet list, and tile images having tile images focus locations coincident with focus facets having substantially collinear focus points, the method preferably further comprises steps of selecting from among focus points in a focus point list, a closest focus point to the tile image focus location; and, assigning the focus setting associated with the closest focus point to the tile image focus setting.

The invention also provides a method of acquiring tile image constituents of an image-mosaic representative of a sample having at least a one of a tilted and an uneven surface of interest that is micro-imaged using a high magnification micro-imaging system. The method comprises steps of selecting a tile image to be acquired, the tile image having an associated tile image focus location with respect to a sample coordinate space defined by the sample; determining a focus facet coincident with the tile image focus location by parsing a focus facet list of focus facet constituents of a focus surface, each focus facet in the focus facet list being defined by a focus point group, and each focus point in the focus point group having positional coordinates with respect to the sample coordinate space, as well as an associated focus setting; interpolating the focus settings of the focus points of the focus facet coincident with the tile image focus location to determine a tile image focus setting; positioning the micro-imaging system in relation to the sample so as to acquire a tile image associated with the tile image focus location; adjusting a focusing mechanism of the micro-imaging system to the tile image focus setting; and acquiring the tile image.

A primary advantage of the invention is ensuring that the micro-imaging system focuses correctly on a selected sample IC, and in particular on features revealed at each deconstructive step in the process of reverse engineering the IC. A further advantage is the generation of a virtual focus surface that closely follows the relief of the surface of interest to provide tile image focus settings at tile image focus locations. This eliminates reliance on autofocus while acquiring tile images using the micro-imaging system, which is known to be unreliable for that purpose.

BRIEF DESCRIPTION OF THE DRAWINGS

Further features and advantages of the present invention will become apparent from the following detailed description, taken in combination with the appended drawings, in which:

FIG. 2 is a process diagram showing an exemplary progression of steps in manufacturing a sample IC;

FIG. 3 is a process diagram showing an exemplary progression of steps in deconstructing a sample IC for reverse-engineering;

FIG. 4 shows an example of a micro-imaging system comprising a computer controlled optical stage and an imaging system such as a high magnification power microscope equipped with a digital imaging system including a Charge Coupled Device (CCD) camera;

FIG. 7 is a schematic diagram showing an exemplary selection of focus points having coordinate positions with respect to a sample coordinate space in accordance with the preferred embodiment of the invention;

FIG. 8 is a schematic elevational diagram showing positional relationships of focus points shown in FIG. 7 in a cross-section through the sample IC silicon substrate taken along line 8—8 of FIG. 7;

FIG. 13 is a schematic diagram showing a superposition of a computed triangular mesh over the portion of a surface of interest in accordance with an exemplary embodiment of the invention;

FIG. 14 is a schematic perspective diagram showing focus points defining a focus facet according to a preferred embodiment of the invention;

FIG. 15 which appears on sheet seven of the drawings, is a schematic elevational diagram showing a cross-section of a focus surface and its positional relationship to the relief of the surface of interest of the sample IC;

FIG. 16 is a schematic diagram showing positional relationships between the triangular mesh and tile images of the surface of interest of the sample IC to be acquired in accordance with a preferred embodiment of the invention;

FIG. 17 is a schematic diagram showing a tile image acquisition sequence prescribed by an exemplary tiling algorithm in accordance with a preferred embodiment of the invention;

FIG. 18 is another schematic diagram showing a tile image acquisition sequence prescribed by another exemplary tiling algorithm in accordance with another embodiment of the invention;

FIG. 19 is a schematic diagram showing an exemplary tile image acquisition sequence used in acquiring specified tile images in accordance with yet another embodiment of the invention;

It will be noted that throughout the appended drawings, like features are identified by like reference numerals.

DETAILED DESCRIPTION OF THE PREFERRED EMBODIMENT

Figure 1:
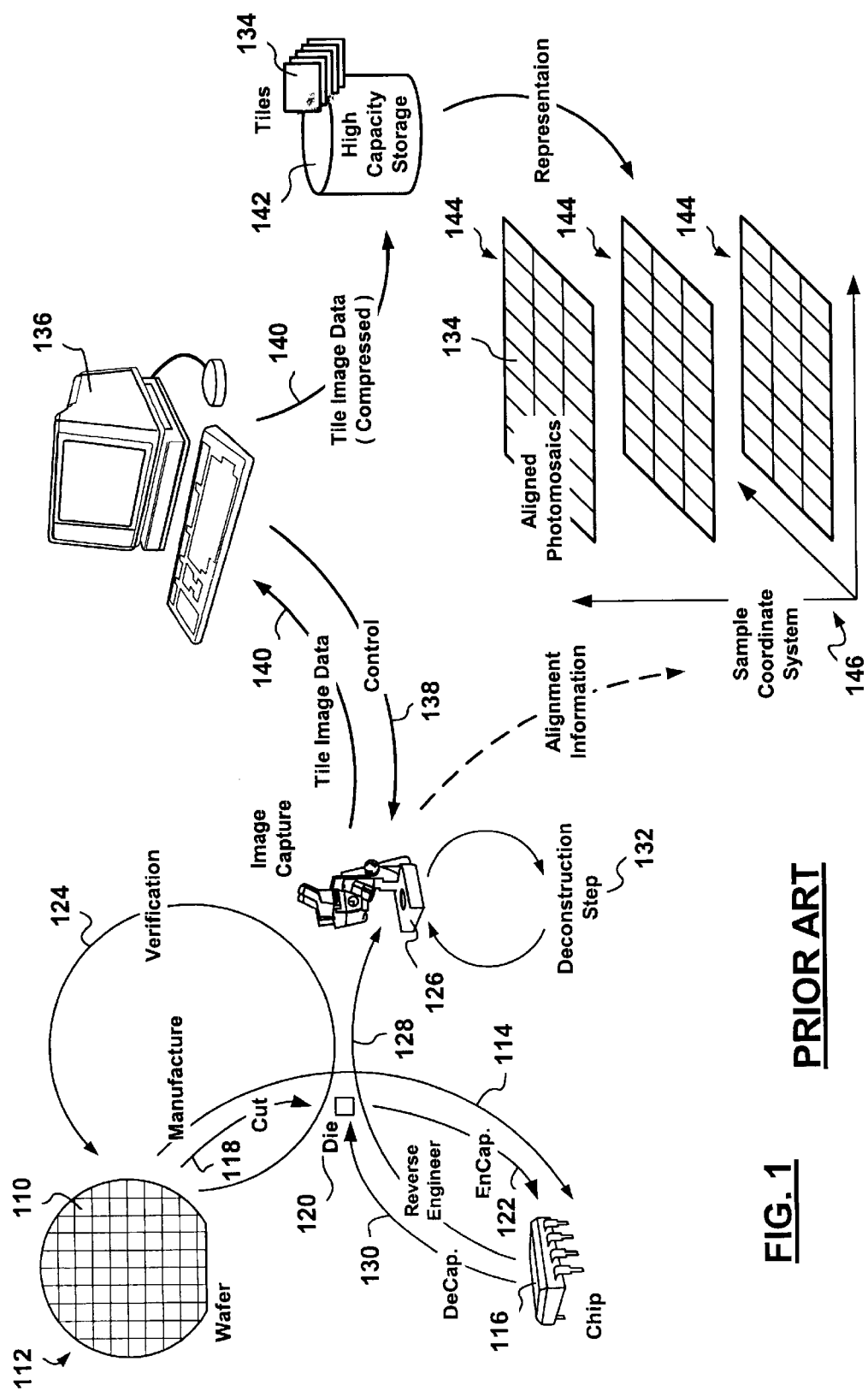
FIG. 1 is a work flow diagram showing an overview of an exemplary process by which image-mosaics representative of steps in a deconstruction of a semiconductor integrated circuit (IC) are acquired.

FIG. 1 is a work-flow diagram showing an overview of an exemplary prior art process by which image-mosaics representative of steps in the deconstruction of a semi-conductor integrated circuit (IC) are acquired. IC's 110 are fabricated on a wafer 112. The wafer 112 comprises a mono-crystalline silicon substrate which is a natural insulator. Doping the silicon substrate with other chemical elements can change the properties of the silicon, including making the silicon substrate a semi-conductor or a conductor. Such substrate processing is performed as part of a manufacturing process 114 of chip 116. In packaging a chip 116, a die 120 is cut in a step 118 from the wafer 112 and is encapsulated in step 122 to form the chip 116.

The manufacture of integrated circuits typically involves a verification process 124 by which wafers 112, cut dies 120, or portions thereof are inspected using a micro-imaging system 126 to extract design and layout information for design validation or purposes of competitive analysis.

For the purposes of product quality assurance or competitive analysis, for example, a process of reverse-engineering 128 is performed on the chip 116. A first step in the reverse-engineering process 128 is a decapsulation 130 of the chip 116 to remove the die 120. Die 120 is inspected using the micro-imaging system 126 to extract design and layout information. The micro-imaging system 126 may include high magnification optical microscopes, scanning electron microscopes, field emission electron microscopes, or the like. Design and layout extraction from a die 120 or portion thereof involves a process of deconstruction 132 by which layers formed during the manufacturing process 114 are removed step-by-step.

High magnification tile images 134 of the sample die 120 are acquired between each deconstructive step 132 under the control of a computer workstation 136. The computer workstation 136 controls the micro-imaging system 126 using control signals 138. The computer workstation 136 receives tile image data 140 from the micro-imaging system 126 and saves the tile image data 140 to memory, typically high capacity storage 142, such as a hard disk. Generally, the tile image data 140 is transmitted to the high capacity storage 142 and stored in a compressed format minimizing data transfer requirements between the computer workstation 136 and the high capacity storage 142 and, minimizing data storage requirements at the high capacity storage 142.

The stored tile images 134 are assembled into image-mosaics 144, each image-mosaic 144 representing a surface of interest of the die 120 at a deconstructive step 132. During acquisition of the tile images 134 of the die 120, a sample coordinate space 146 is defined. The sample coordinate space 146 is used to align the tile images 134 and the image-mosaics 144.

FIG. 2 is a process diagram showing an exemplary prior art progression of steps followed during the manufacture of an IC. The diagram shows a progression of cross-sections through a silicon substrate, representing exemplary steps in manufacturing a component such as a junction. In step 152 of the progression, the silicon substrate is doped using diffusion and/or ion implantation techniques to change its characteristics and, in particular, to form P-wells, well known in the art. In step 154, another implantation is performed to form N-type sources and drains. A gate oxide layer is deposited between the sources and drains, and a field oxide is deposited in other areas of the chip in step 156. A polysilicon gate layer is deposited in step 158, and in steps 160 and 162 the deposition of oxide layers is effected. Metal layers for providing connectivity between the gates, sources and drains are deposited in step 164. Step 166 illustrates the deposition of a passivation layer, typically used to protect the IC from physical damage and/or contamination with dust particles before it is encapsulated in step 122 (FIG. 1).

FIG. 3 is a process diagram showing an exemplary prior art progression of deconstructive steps used to reverse-engineer a sample IC. Step 170 illustrates a cross-section through a silicon substrate of a die 120 after decapsulation in step 130 (FIG. 1). Steps 172, 174, 176, 178, 180 and 182 illustrates a progressive removal of the deposited material layers, such as the passivation layer, metalization layers, polysilicon layers, base contact layers, the field oxide layer, etc. This results in an exposed silicon substrate (step 182) including the well structures manufactured during steps 152 and 154 (FIG. 2). In order to reveal the well structure, the back surface of the die 120 may also be deconstructed. Steps 184 and 186 show the progressive deconstruction of the back surface of the die 120 to expose the P- and N-wells. In extracting design and layout information both surfaces of the die 120 may be micro-imaged, and therefore both represent surfaces of interest.

FIGS. 2 and 3 also show components spanning deposition layers, the surface of interest having a relief and traces that follow the relief.

FIG. 4 shows a prior art example of a micro-imaging system used to acquire tile images of a sample IC. The micro-imaging system 126 typically includes an optical stage schematically illustrated in the diagram at 200. The optical stage 200 provides positioning of the die 120 with respect to the high magnification microscope 210. The optical stage 200 has a vertical axis of displacement 202 and two horizontal axes of displacement 204 and 206. Collectively the axes of displacement 204 and 206 provide motion of the die 120 in a field of view of the microscope 210. Axis of displacement 202 provides positioning of the die 120 in a direction perpendicular to the field of view of the microscope 210 and therefore enables focusing of high magnification optics of the microscope 210 onto a surface of the die 120.

Acquisition of tile images 134 is facilitated by a digital imaging system such as a Charge Coupled Device (CCD) camera 230 having pixelated light sensing elements. The optical stage 200 and CCD camera 230 receive control signals 138 from a computer workstation 136 to position the die 120 and move it into focus under the microscope 210. Other control signals 138 effect the capture of tile images 134 which are transferred as digital data 140 to the computer workstation 136.

Figure 5:
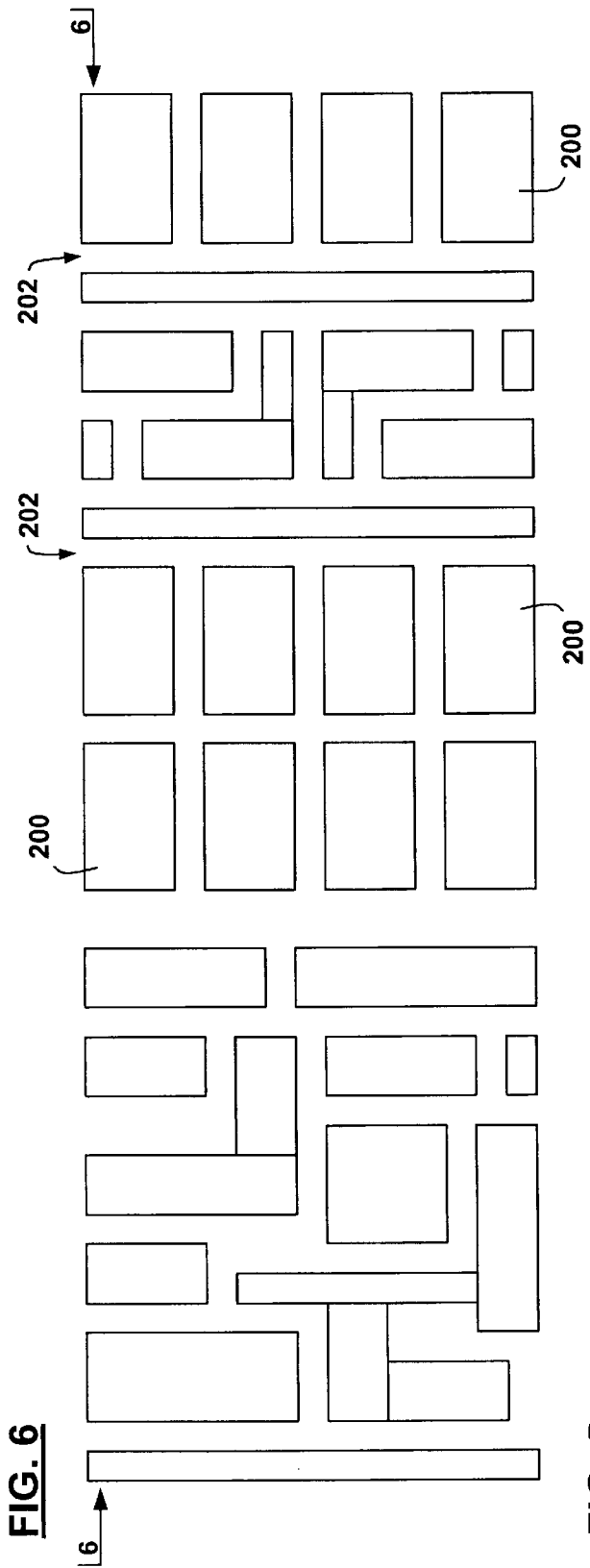
FIG. 5 is a schematic diagram showing a plan view of an exemplary portion of a surface of interest of a sample IC corresponding to an exemplary deconstructive step.

FIG. 5 is a schematic diagram showing a plan view of an exemplary portion of a surface of interest of a sample IC corresponding to a deconstructive step in reverse-engineering the sample IC. A representation of the field of view of the micro-imaging system 126 (FIG. 4) is presented to an analyst via the computer workstation 136 (FIG. 1) in a view. The analyst cannot see all features in focus (sharpness)due to the shallow depth-of-field of the micro-imaging system 126, and also due to the fact that the components project above the silicon substrate (not shown) of the sample IC die 120. An analyst can, however, discern components such as capacitor components 200 due to their relative size and shape, and perhaps also due to their relationship to other components on the silicon substrate. The analyst can likewise discern abrupt changes in elevation of the surface of interest such as shown at 202 by observing abrupt changes in sharpness of the focus in the field of view.

Figure 6:
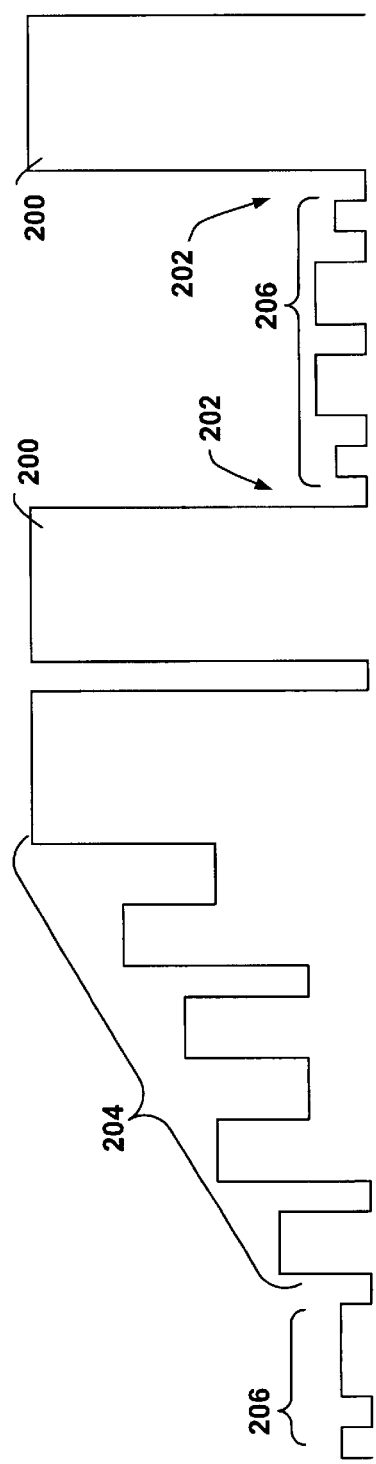
FIG. 6 is a schematic elevational diagram showing a cross-section of the sample IC silicon substrate along the line 6—6 of FIG. 5.

FIG. 6 is a schematic elevational diagram showing a cross-section of the sample IC silicon substrate taken along line 6—6 of FIG. 5. As is apparent, the deconstruction of a sample IC generally does not yield flat surfaces. Components manufactured on the silicon substrate of the die 120 project above the surface of the silicon substrate. By gradually changing the focus setting of the micro-imaging system 126 while observing an image of the surface displayed on the computer workstation 136 as the image is refreshed, the analyst can also observe sloped portions of the relief such as shown at 204 and relatively flat portions such as shown at 206.

In accordance with the preferred embodiment of the invention, a plurality of focus points 230, 232 and 234 are selected on a surface of an IC. Each focus point has a respective positional x-y coordinate with respect to a sample coordinate space defined by the sample IC die 120. An associated focus setting is determined for each of the focus points 230, 232 and 234 to enable the calculation of focus settings at other locations on the surface intermediate the respective focus points.

FIG. 7 is a schematic diagram showing an exemplary selection of focus points 230, 232 and 234 having coordinate positions with respect to a sample coordinate space defined by the sample IC die 120. FIG. 8 is a schematic elevational diagram showing positional relationships of focus points shown in FIG. 7 in a cross-section through the sample IC silicon substrate taken along line 8—8.

Using the computer workstation 136 (FIG. 1) the analyst selects focus points 230, 232 and 234 by pointing at displayed features of the sample IC die 120 displayed in the view as the computer workstation 136 is operated in a focus point selection mode. In accordance with a preferred embodiment of the invention, focus points such as 232 are selected in close proximity to an abrupt change in elevation 202 of the 3-dimensional relief on the surface of the sample IC die 120.

Figure 9:
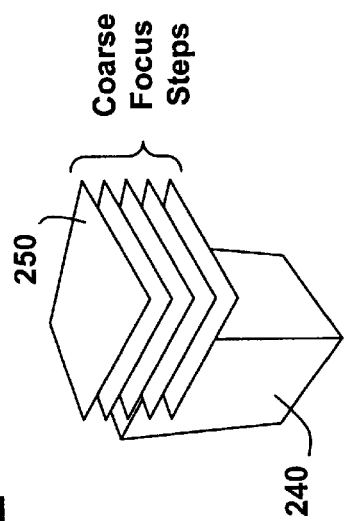
FIG. 9 is a schematic perspective diagram showing a schematic component manufactured on a silicon substrate and relative positions of focusing planes of images acquired in extracting focus measures in a coarse focus search.

FIG. 9 is a schematic perspective diagram illustrating focus setting determination at a focus point located on a common component 240 manufactured on a silicon substrate. Relative positions of focus planes 250 of images acquired in a process of acquiring focus measures 250 during a coarse focus search.

Figure 10:
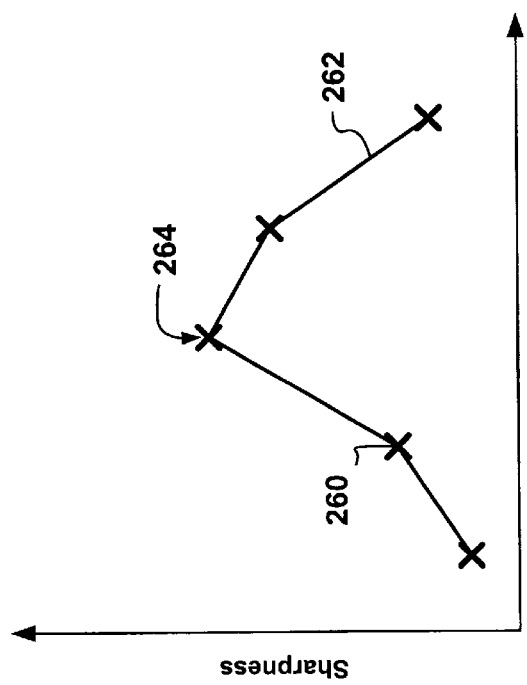
FIG. 10 is a graph showing an example of a variation of a sharpness measure in a progression of focus settings of images acquired in performing a coarse focus search.

FIG. 10 is a graph illustrating a variation of a sharpness measure 262 associated with a progression of focus settings of images acquired during the coarse focus search shown in FIG. 9.

Figure 11:
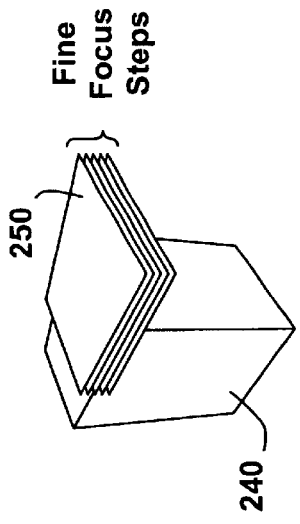
FIG. 11 is a schematic perspective diagram showing a schematic component manufactured on a silicon substrate and relative positions of focusing planes of images acquired in extracting focus measures in a fine focus search.

FIG. 11 is a schematic perspective diagram illustrating component 240 with respect to relative positions of focus planes 250 of images acquired in a process of acquiring focus measures 260 during a fine focus search.

Figure 12:
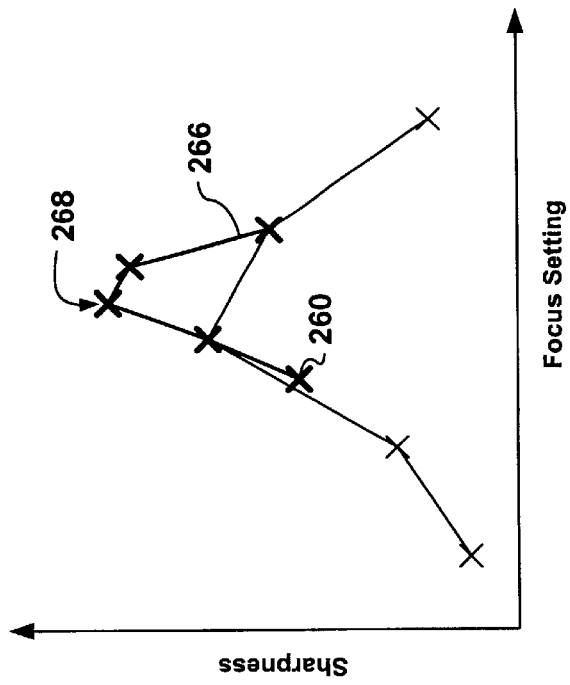
FIG. 12 is a graph showing an example of a variation of a sharpness measure in a progression of focus settings of images acquired in performing a fine focus search.

FIG. 12 is a graph showing an example of a variation of a sharpness measure 266 for a progression of focus setting images acquired during the fine focus search shown in FIG. 11.

In accordance with a preferred embodiment of the invention, a focus setting determination is performed by selecting a focus setting used during the acquisition of a best-focused image from a series of images acquired during a monotonically varying progression of focus settings. The sample IC die 120 (FIG. 4) is positioned by moving the optical stage 200 along the vertical axis 202 (FIG. 4) at focus settings below and above a it current focus setting. The coarse focus search is first performed by moving the optical stage 200 in coarse increments. An image 250 in a series is captured at each focus increment, and displayed on the computer workstation 136. A focus measure 260 is derived from each image in the series. Preferably, the focus measure 260 is an image sharpness measure, but other focus measures can also be used. Various algorithms for calculating the sharpness of an image are known to persons skilled in the art. The focus measure 260 is used to select the best focused image in the series. The variation in the focus measure may be monotonically varying or peaked.

If the variation in the focus measure is monotonic (not shown) then the best focus setting is the focus setting associated with the image having the highest focus measure (unique sharpness). However, another focus search is preferably run to determine if a higher focus measure exists in order to locate a peak in the variation of the focus measure.

If the variation 262 of the image sharpness measure is peaked, as shown in FIG. 10, then a fine focus search is preformed after the coarse focus search. In accordance with the invention the optical stage 200 is moved in fine increments for the fine focus search. Fine increments around the highest image sharpness measure 264 of the peak corresponding to the coarse focus search are used to find an image having the highest image sharpness measure 268. Focus searching is performed using coarse and fine focus adjustment increments in accordance with the preferred embodiment of the invention. However, other methods may be used. It should also be understood that the invention is not limited to mechanical focus adjustment systems. Persons skilled in the art will understand that focus adjustment may also be achieved by changing lens properties, as is the case in focused ion beam imaging, or the like.

In accordance with the invention, the selected focus points such as 230, 232 and 234 are used as input to a mesh generation algorithm. Mesh generation algorithms extract point groupings to define mesh cells. A well-known mesh generation algorithm is the Delaunay triangulation algorithm. The Delaunay triangulation algorithm generates point groupings having three points, which are referred to as a "point triad". Each point triad defines vertices of a triangular mesh cell. An exemplary triangular mesh cell specified by a focus point triad is shown in FIG. 13 at 270. The juxtaposed mesh cells form a "triangular mesh" generated by the Delaunay triangulation algorithm.

As shown in FIG. 13, a triangular mesh 272 substantially covers the surface of interest. A corner 274 of the surface of interest is not covered by the triangular mesh 272. The degree of coverage of the surface of interest by the triangular mesh is dependent on the position of focus points 230, 232 and 234 selected. The focus points are preferably selected so that mesh cells having a small area, such as shown at 276, are generated by the Delaunay triangulation algorithm in areas where there are abrupt changes in elevation on the surface of interest. The selection of closely spaced focus points 232 in the vicinity of the abrupt, changes 202 in elevation yields small area mesh cells 276 in those areas.

FIG. 14 is a schematic perspective diagram illustrating a focus facet associated with a mesh cell. The focus settings associated with each focus point 230, 232 and 234 in each focus point triad and the positional coordinates of each focus point 230, 232 and 234 in each focus point triad define a focus facet 280 associated with the mesh cell 270. Focus facets 280 are juxtaposed and form a "focus surface" (see FIG. 15) in a hybrid three-dimensional coordinate space 284 defined by the x-y coordinates of the respective focus points on the sample coordinate space and respective focus settings associated with each focus point. Each mesh cell represents a projection of the focus facet onto the surface of interest of the die 120.

FIG. 15 is a schematic elevational diagram showing a cross-section of an exemplary focus surface in accordance with a preferred embodiment of the invention and its relationship to the relief of the surface of interest of the sample IC. The cross-section shown in FIG. 15, taken along line 15—15 of FIG. 13, shows that the focus surface closely conforms to the relief on the sample IC die 120, if the focus points are well selected. The dashed line represents a locus of focus points. Sections 288 representative of a focus facet associated with mesh cells 276 is steeply inclined due to the abrupt change in elevation of the relief.

FIG. 16 is a schematic diagram showing positional relationships between the mesh cells shown in FIG. 13 and tile images of the surface of interest of the sample IC to be acquired. The tiling pattern for the surface of interest of the sample IC die 120 can be determined by a tiling algorithm, or specified apriori. Tiling algorithms typically output a sequential list of tiles which can be used to effect the order in which tile images of the surface of interest are acquired.

FIGS. 17 and 18 are schematic diagrams showing exemplary tile image acquisition sequences output by tiling algorithms. As will be understood by those skilled in the art, images of the entire surface of interest are not always required. Consequently, other tile image acquisition patterns may be followed, such as shown in FIG. 19. It should also be understood that a tiling algorithm is not required to output a tile list having tiles of the same size or the same geometry. FIG. 16 shows the portion of the surface of interest tiled with quadrilateral tiles such as rectangular tiles 290 and square tiles 292. Each tile image 134 having a geometry specified by tiles 290 and 292 has an associated tile image focus location 294. Typically, the tile image focus location 294 is located on a geometrical center of the corresponding tile but may be positioned elsewhere.

In accordance with the preferred embodiment of the invention focus points are selected to generate a triangular mesh 272 that covers the surface of interest in such a way that each tile image focus location is coincident with at least one mesh cell. In practice features enabling focusing may not be available on certain portions of the surface of interest, such as would be the case with a portion of the substrate having no components or traces. FIG. 16 also shows a tile 296 having a tile image focus location 294 outside of the triangular mesh 272. If this occurs, a tile image can only be acquired by using the focus setting of the nearest focus point, focus point 234 in this example.

Figure 20A:
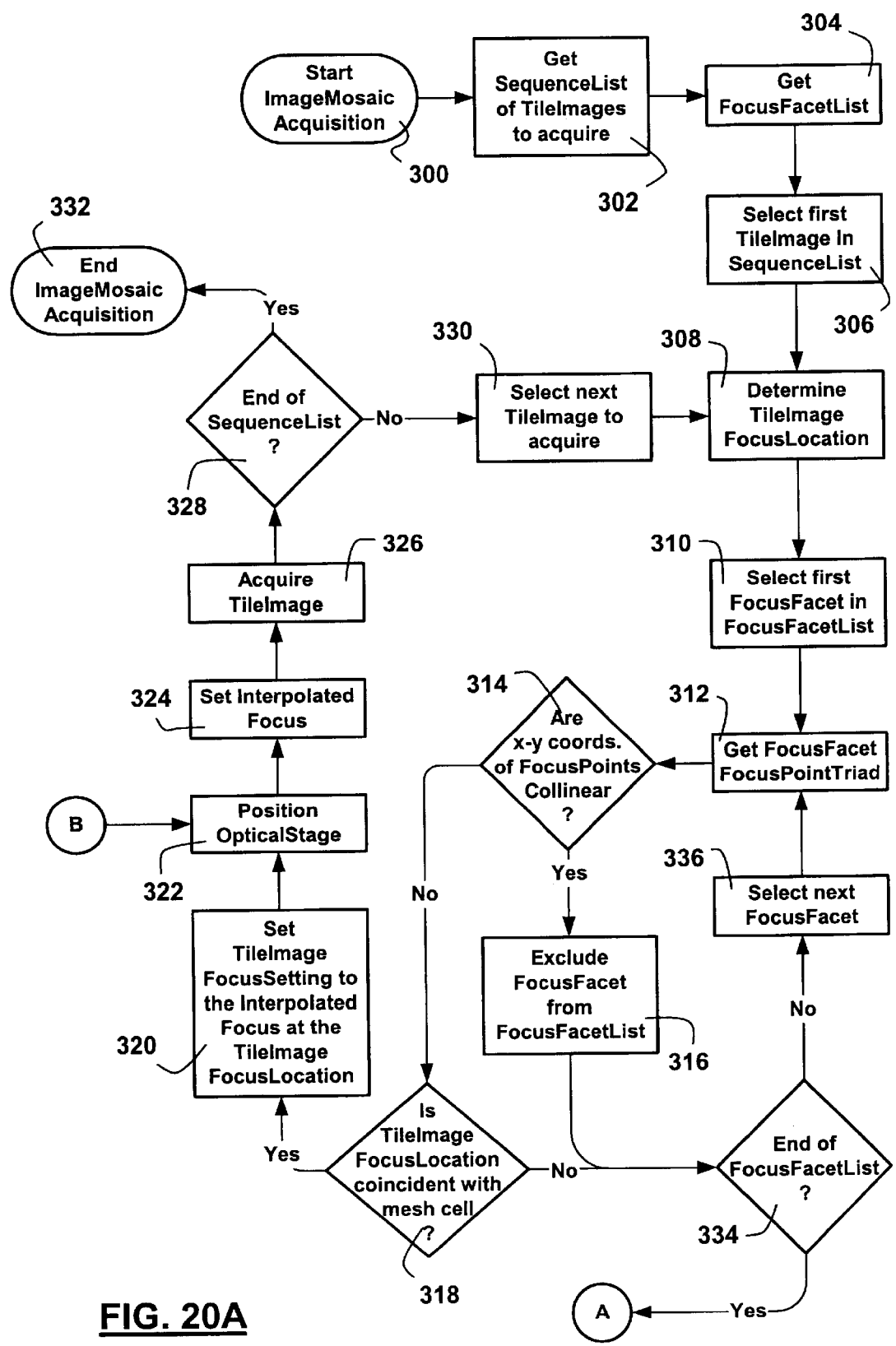
FIGS. 20A and 20B are flow diagrams showing a process by which focus settings are provided at tile image focus locations given a focus surface, in accordance with a preferred embodiment of the invention.
Figure 20B:
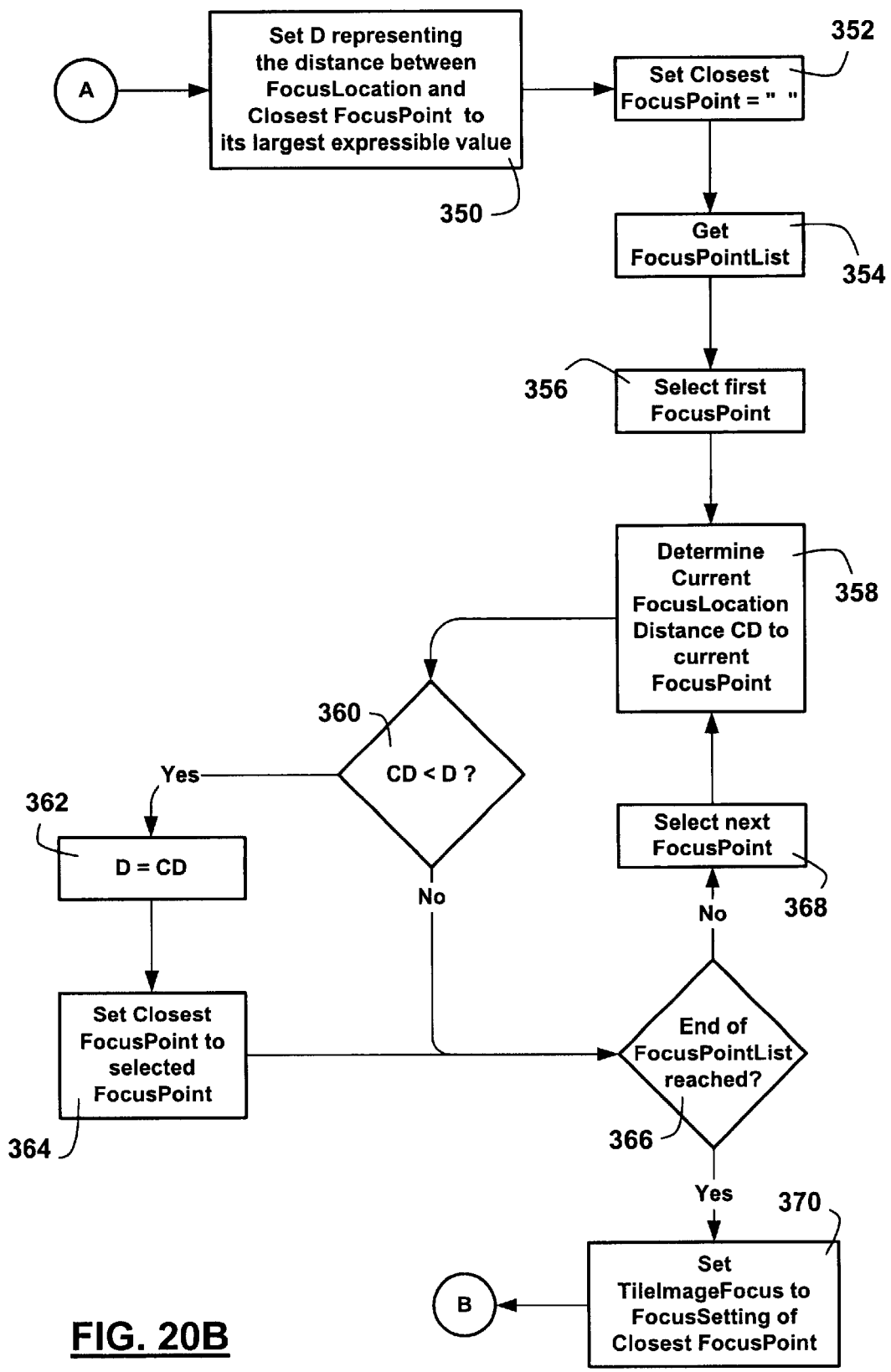

FIGS. 20A and 20B are flow diagrams showing a process by which focus settings are determined for tile image focus locations, given a focus surface derived in accordance with a preferred embodiment of the invention. A process for acquiring tile images for an image-mosaic is begun in step 300. A list of tile images to be acquired, typically specifying a tile image acquisition sequence, is retrieved in step 302, and a focus facet list is retrieved in step 304. The image-mosaic acquisition process proceeds by selecting from the tile image list a first tile image to be acquired in step 306. For each selected tile image, the image-mosaic acquisition process determines the tile image focus location 294 (FIG. 16) in step 308. As noted above, the tile image focus location is generally the geometrical center of the tile image to be acquired. The focus facet list is searched for a focus facet coincident with the tile image focus location 294.

The first focus facet in the focus facet list is selected in step 310. The image-mosaic acquisition process determines the focus point triad associated with the selected focus facet (step 312). A preliminary check is performed in step 314 to determine whether the x-y coordinates of the focus points in the focus point triad are collinear. Well known mathematical manipulations that provide a measure of collinearity may be used for this purpose. The area of the mesh cell defined by the focus point triad can be computed as a simple measure of collinearity. A mesh cell having a zero area is defined by collinear focus points. In accordance with a preferred embodiment of the invention, collinearity is ascertained using a collinearity threshold. A mesh cell having an area that is less than or equal to a predefined threshold is assumed to have collinear focus points. If a focus facet is determined to be associated with a mesh cell having collinear focus points, that focus facet is excluded from the focus facet list in step 316. Focus facets associated with mesh cells 276 having a small surface area are typically adjacent abrupt changes 202 in the elevation of the relief on the surface of interest of the sample IC die 120. The collinearity threshold can be selected to exclude a majority of small area mesh cells, such as 276. As described above with respect to FIG. 15, focus facets associated with mesh cells 276 having a small surface area are generally steeply inclined. Therefore, deriving focus settings from such focus facets may result in out-of-focus tile images, because of the shallow depth-of-field of the imaging equipment.

If the x-y coordinates of the focus points in the focus point triad associated with the selected focus facet are not collinear, as determined in step 314, the image-mosaic acquisition process determines whether the tile image focus location is located within the mesh cell associated with the selected focus facet (step 318). Mathematical methods for determining whether the tile image focus location is located within the mesh cell are well known in the art. On determining that the tile image focus location is coincident with the mesh cell associated with the selected focus facet, a tile image focus setting 298 (FIG. 14) is set in step 320 to a value interpolated with respect to the tile image focus location. The x-y positional coordinates and associated focus settings of the focus points in the focus point triad associated with the selected focus facet are used as inputs to the interpolation calculation.

The optical stage 200 is positioned in accordance with the specified x-y coordinates of the tile image focus location in step 322. The field-of-view of the micro-imaging system 126 is brought into focus in step 324 using the tile image focus setting and a tile image 134 is acquired in step 326. If the end of the tile image sequence list has not been reached, as ascertained in step 328, the image-mosaic acquisition process selects a next tile image to be acquired (step 330) and resumes from step 308. If it is determined that the end of the tile image sequence list has been reached in step 328, the image-mosaic acquisition process ends in step 332.

If the tile image focus location is not found to be coincident with the mesh cell associated with the selected focus facet (step 318), or if the selected focus facet was discarded from the focus facet list (in step 316), and, the end of the focus facet list has not been reached (step 334), the image-mosaic acquisition process selects a next focus facet from the focus facet list (step 336), and resumes from step 312. If the end of the focus facet list is reached in step 334, the tile image focus location is either outside the triangular mesh 272, or the image focus location is coincident with a focus facet having focus points that are determined to be co-linear, as described above. In order to determine a tile image focus setting, the image-mosaic acquisition process therefore searches for a closest focus point to the tile image focus location. The associated focus setting of the closest focus point is then used as the tile image focus setting.

A process of searching for the closest focus point is described with reference to FIG. 20B. In step 350, variable (D) is set to an arbitrary value greater than any dimension of the IC die 120 to ensure that all focus points are considered. A default value such as a largest expressible value for the variable D may be used. A pointer referencing a closest focus point is set to NULL in step 352. The image-mosaic acquisition process locates the focus point list in step 354 and a first focus point is selected from the list in step 356. The current distance (CD) between the tile image focus location and the selected focus point is determined in step 358.

If CD is less than D, that is the currently calculated distance is less than the distance between the tile image focus location and the closest focus point found so far, which is ascertained in step 360, D is set to CD in step 362 and the nearest focus point pointer is set in step 364 to reference the selected focus point. The image-mosaic acquisition process parses the entire focus point list by selecting a next focus point in the focus point list (steps 366 and 368). On reaching the end of the focus point list in step 366 the process sets the tile image focus setting to the focus setting associated with the focus point indicated by the nearest focus point pointer. Thereafter, the optical stage is positioned in step 322, the focus is set in step 324 and the image is acquired in step 326.

The invention therefore provides a method and apparatus for focusing a micro-imaging system on a tilted or uneven surface for acquiring tile images of the surface quickly and efficiently. After an initial acquisition of focus points, the image capture process proceeds automatically without operator intervention.

The embodiments of the invention described above are intended to be exemplary only. The scope of the invention is therefore intended to be limited solely by the scope of the appended claims.

I claim:

1. An apparatus for micro-imaging an uneven surface of interest of a sample comprising:
   a) means for selecting and storing positional coordinates of focus points associated with a sample coordinate space defined by the sample, to create a focus point list;
   b) means for determining an associated focus setting for each focus point in the focus point list;
   c) means for generating a focus surface using the focus point list;
   d) means for extracting a tile image focus setting at a tile image focus location from the focus surface wherein the means for extracting a tile image focus setting at a tile image focus location from the focus surface comprises an algorithm that selects a focus facet coincident with the tile image focus location, interpolates at the tile image focus location the focus settings associated with the focus points in the focus point group associated with the selected focus facet and sets the tile image focus setting to the interpolated focus setting; and
e) means for positioning a micro-imaging system to acquire a tile image at the tile image focus setting.

2. An apparatus as claimed in claim 1, wherein the means for selecting and storing positional coordinates of focus points associated with a sample coordinate space comprises a man-machine interface for sending control messages to the micro-imaging system, and receiving image data from the micro-imaging system.

3. An apparatus as claimed in claim 1, wherein the means for determining a focus setting associated with each focus point further comprises means for extracting a focus measure from image data received from the micro-imaging system.

4. An apparatus as claimed in claim 3, wherein the means for extracting a focus measure comprises an algorithm that performs pixel operations on the image data to extract a sharpness measure.

5. An apparatus as claimed in claim 1, wherein the means for generating a focus surface using the focus point list comprises means for grouping focus points from the focus point list into focus point groups, the focus point groups being stored in a focus point group list.

6. An apparatus as claimed in claim 5, wherein the means for grouping focus points into focus point groups comprises a focus point grouping algorithm, the positional coordinates and the associated focus setting of each focus point in a focus point group forming a focus facet, and the focus surface comprises abutting focus facets.

7. An apparatus as claimed in claim 6, wherein the focus point grouping algorithm comprises a mesh generation algorithm.

8. An apparatus as claimed in claim 7, wherein the mesh generation algorithm is a triangular mesh generation algorithm and each focus point group is a focus point triad.

9. An apparatus as claimed in claim 8, wherein the triangular mesh generation algorithm is the Delaunay triangulation algorithm.

10. An apparatus as claimed in claim 5, wherein the means for grouping focus points into focus point groups further comprises a focus point group exclusion algorithm for excluding from the focus point group list a focus point group having substantially collinear focus points.

11. An apparatus as claimed in claim 1, wherein the means for extracting a tile image focus setting at a tile image focus location from the focus surface comprises an algorithm for selecting a closest focus point to the tile image focus location and setting the tile image focus setting to the focus setting associated with the closest focus point.

12. A method of providing a focus surface for determining a focus setting for a micro-imaging system used to capture micro-images of a surface of interest of a sample, the method comprising steps of:
a) selecting a plurality of focus points respectively having focus point positional coordinates with respect to a sample coordinate, to create a focus point list, at least some of the focus points being selected in close proximity to each other in the vicinity of an abrupt change in elevation of the surface of interest;
b) determining a focus setting for each focus point; and
c) compiling a list of focus point groups from the focus point list wherein each focus point group comprises three focus points that form a focus point triad, each focus point triad defining a triangular mesh cell in the sample coordinate space, the combination of the focus point positions and the focus point settings of the focus points defining a corresponding triangular focus facet and the focus surface comprises adjacent triangular focus facets.

13. A method as claimed in claim 12, further comprising a step of storing the focus point list.

14. A method as claimed in claim 12, wherein mesh cells are generated by a mesh generation algorithm using the plurality of focus points.

15. A method as claimed in claim 14, wherein the mesh generation algorithm comprises a triangulation algorithm.

16. A method as claimed in claim 15, wherein the triangulation algorithm is the Delaunay triangulation algorithm.

17. A method of determining a tile image focus setting for micro-imaging a tile image constituent of an image-mosaic representative of a surface of interest of a sample having at least a one of a tilted and an uneven surface of interest, the method comprising steps of:
a) selecting a tile image to be acquired, the tile image having an associated tile image focus location with respect to a sample coordinate space defined by the sample;
b) determining a focus facet coincident with the tile image focus location using a focus facet list associated with a focus surface of the sample, each focus facet in the focus facet list being defined by a focus point group, and focus points in each focus point group having respective positional coordinates with respect to the sample coordinate space, and an associated focus setting; and
c) interpolating the focus settings of the focus points of the focus facet coincident with the tile image focus location to determine a tile image focus setting for acquiring the tile image.

18. A method as claimed in claim 17, wherein the tile image to be acquired is selected from a tile image acquisition sequence list.

19. A method as claimed in claim 17, wherein the tile image acquisition sequence list is generated by a tiling algorithm.

20. A method as claimed in claim 17, wherein the tile image acquisition sequence list comprises a predetermined list of tile images to be acquired.

21. A method as claimed in claim 17, wherein the tile image has a predetermined shape and the tile image focus location is a geometrical center of the tile image.

22. A method as claimed in claim 17, wherein the method further comprises a step of excluding from the focus facet list focus facets that have substantially collinear focus points.

23. A method as claimed in claim 22, wherein the focus facets are excluded from the focus facet list by computing a collinearity measure using positional coordinates of the focus points of the focus facet.

24. A method as claimed in claim 23, wherein collinearity of the focus points of a focus facet is asserted when a collinearity measure of the focus points is determined to be less than a predetermined threshold.

25. A method as claimed in claim 17, wherein for tile images having tile image focus locations outside all focus facets in the focus facet list and tile images having tile images focus locations coincident with focus facets having substantially collinear focus points, the method further comprises steps of:
a) selecting from among focus points in a focus point list, a closest focus point to the tile image focus location; and b) assigning the focus setting associated with the closest focus point to the tile image focus setting.

26. A method as claimed in claim 17, wherein each focus point group comprises three focus points forming a focus point triad, each focus point triad defining a triangular mesh cell in the sample coordinate space, the combination of the focus point positions and the focus point settings of the focus points defining a corresponding triangular focus facet, and the focus surface comprises adjacent triangular focus facets.

27. A method of acquiring tile image constituents of an image-mosaic representative of a sample having at least a one of a tilted and an uneven surface of interest that is micro-imaged using a high magnification micro-imaging system, the method comprising steps of:

a) selecting a tile image to be acquired, the tile image having an associated tile image focus location with respect to a sample coordinate space defined by the sample;

b) determining a focus facet coincident with the tile image focus location by parsing a focus facet list of focus facet constituents of a focus surface, each focus facet in the focus facet list being defined by a focus point group, and each focus point in the focus point group having positional coordinates with respect to the sample coordinate space, as well as an associated focus setting;

c) interpolating the focus settings of the focus points of the focus facet coincident with the tile image focus location to determine a tile image focus setting;

d) positioning the micro-imaging system in relation to the sample so as to acquire a tile image associated with the tile image focus location;

e) adjusting a focusing mechanism of the micro-imaging system to the tile image focus setting; and f) acquiring the tile image.

28. A method as claimed in claim 27, wherein for tile images having tile image focus locations outside all focus facets in the focus facet list and tile images having tile image focus locations coincident with focus facets having substantially collinear focus points, the method further comprises steps of:

a) selecting from respective focus points in a focus point list a focus point closest to the tile image focus location;

b) positioning the micro-imaging system in relation to the sample so as to acquire a tile image associated with the tile image focus location;

c) adjusting a focusing mechanism of the micro-imaging system to the focus setting of the closest focus point; and d) acquiring the tile image.

* * * * *